(12) United States Patent
Sattler

(10) Patent No.: US 8,813,588 B2
(45) Date of Patent: Aug. 26, 2014

(54) DEVICE FOR GUIDING A POWER TOOL

(75) Inventor: Christian Sattler, Biessenhofen (DE)

(73) Assignee: Hilti Aktiengesellschaft, Schaan (LI)

( * ) Notice: Subject to any disclaimer, the term of this patent is extended or adjusted under 35 U.S.C. 154(b) by 356 days.

(21) Appl. No.: 13/314,737

(22) Filed: Dec. 8, 2011

(65) Prior Publication Data

US 2012/0148176 A1 Jun. 14, 2012

(30) Foreign Application Priority Data

Dec. 9, 2010 (DE) .......................... 10 2010 062 709

(51) Int. Cl.
*F16H 19/04* (2006.01)

(52) U.S. Cl.
USPC .................................. 74/32; 74/422; 408/110

(58) Field of Classification Search
USPC .......... 74/29, 30, 32, 422; 408/110, 236, 135, 408/111, 88
See application file for complete search history.

(56) References Cited

U.S. PATENT DOCUMENTS

| 2,038,422 | A | * | 4/1936 | Decker ......................... 408/136 |
| 2,477,916 | A | * | 8/1949 | Wilhide ......................... 408/136 |
| 2,820,377 | A | * | 1/1958 | Buck ................................ 408/76 |
| 3,456,738 | A | * | 7/1969 | Harry .............................. 173/18 |
| 4,468,159 | A | | 8/1984 | Oster |
| 4,582,105 | A | | 4/1986 | Wolff |
| 5,061,124 | A | * | 10/1991 | Chen ............................. 408/135 |
| 5,660,508 | A | * | 8/1997 | Schneider ...................... 408/111 |
| 5,888,031 | A | * | 3/1999 | Buck et al. ....................... 408/56 |
| 5,954,460 | A | * | 9/1999 | Degen et al. .................. 408/112 |
| 6,039,038 | A | * | 3/2000 | Buck et al. ...................... 125/39 |
| 6,223,794 | B1 | * | 5/2001 | Jones ......................... 144/135.2 |
| 6,309,148 | B1 | * | 10/2001 | Wang ............................. 408/87 |
| D451,108 | S | * | 11/2001 | Hinch .......................... D15/132 |
| 6,692,201 | B2 | * | 2/2004 | Soderman ..................... 408/111 |
| 7,070,366 | B2 | * | 7/2006 | Reichenberger et al. ........ 408/76 |
| 7,214,007 | B2 | * | 5/2007 | Baratta ......................... 408/111 |
| 7,487,576 | B2 | * | 2/2009 | Baratta et al. ................. 29/26 A |
| 7,488,144 | B2 | * | 2/2009 | Boyl-Davis et al. .......... 408/1 R |
| 7,509,984 | B2 | * | 3/2009 | Schwaiger et al. ............. 144/82 |
| 7,520,702 | B2 | * | 4/2009 | Wiehler et al. ............... 408/136 |
| 7,632,047 | B2 | * | 12/2009 | Buttrick et al. ............... 408/1 R |
| 7,862,265 | B1 | * | 1/2011 | Clark ............................ 408/110 |

FOREIGN PATENT DOCUMENTS

EP 0 139 819 A2 5/1995

* cited by examiner

*Primary Examiner* — David M Fenstermacher
(74) *Attorney, Agent, or Firm* — Davidson, Davidson & Kappel, LLC

(57) ABSTRACT

A device (3) for guiding a power tool (2) along an advancing direction (18), consisting of a baseplate (9) that can be fastened to a substrate (8) by a fastening means (10), of a guide rail (11) that can be joined to the baseplate (9) and that has a contour (21), and of a guide carriage (16) for guiding the power tool (2) along the advancing direction (18), whereby the guide carriage (16) has a counter-contours (22) that can be made to engage with the contour (21), the guide rail (11) being joined to an axis element (24) and is configured so that it can rotate relative to the baseplate (9) around a rotational axis (23) that is parallel to the advancing direction (18).

10 Claims, 5 Drawing Sheets

DEVICE FOR GUIDING A POWER TOOL

This claims the benefit of German Patent Application DE 10 2010 062 709.7, filed Dec. 9, 2010 and hereby incorporated by reference herein.

The present invention relates to a device for guiding a power tool.

BACKGROUND

Prior-art devices for guiding a power tool along an advancing direction consist of a baseplate that can be fastened to a substrate by a fastening means, and of a guide rail that can be joined to the baseplate and that has a contoured means. The power tool is arranged on the guiding device by means of a guide carriage and can be moved along the guide rail by means of an advancing mechanism. The guide carriage has a counter-contoured means that can be made to engage with the contoured means.

When core holes are drilled, large forces and torques are exerted that have to be absorbed by the guiding device. For this reason, the guiding device has to stand securely and has to be fastened to a substrate. When core holes are being drilled in steps, the problem arises that the footprint on which the baseplate of the guiding device can be fastened is very limited in size.

SUMMARY OF THE INVENTION

It is an objective of the present invention to provide a device for guiding a power tool in such a way that it becomes easier to drill core holes in steps.

According to the invention, it is provided that the guide rail is joined to an axis element and is configured so as to be rotatable relative to the baseplate around a rotational axis that is parallel to the advancing direction. The advantage of the rotatable guide rail is that, in the case of a substrate of limited size, the baseplate can be oriented in such a way that the baseplate is firmly secured to the substrate. The power tool can be moved into the desired working position by means of the rotatable guide rail.

Preferably, the axis element is mounted in a first bearing element of the baseplate and in a second bearing element of the guide rail.

Especially preferably, the axis element is mounted in an additional bearing element of the guide rail, whereby the other bearing element is arranged on an end of the guide rail facing away from the baseplate. The additional bearing element increases the stability and the orientation of the guide rail parallel to the rotational axis. Moreover, a locking means can be provided at the top of the guide rail in order to lock the guide rail by means of the axis element, so that said locking means, which is at the top, is readily accessible and easy to operate in comparison to a locking means that is arranged between the baseplate and the guide rail.

In a preferred embodiment, the axis element is non-rotatably joined to the baseplate while the guide rail is configured so as to be rotatable around the rotational axis relative to the axis element. This embodiment is advantageous when the axis element is mounted in two bearing elements of the guide rail that are installed on ends that are opposite from each other. Owing to this mounting, the axis element is properly guided and the orientation of the guide rail during the rotation around the rotational axis is stable and parallel to the advancing direction. This embodiment lends itself particularly well for heavy guide rails.

In an alternative preferred embodiment, the axis element is configured so as to be joined non-rotatably to the guide rail and rotatable around the rotational axis relative to the baseplate. This embodiment is advantageous when the axis element is mounted in two bearing elements of the baseplate that are installed on ends that are opposite from each other. This embodiment lends itself particularly well for short and/or lightweight guide rails.

Preferably, a locking means is provided for locking the guide rail, whereby the guide rail can be moved by the locking means between a setting position in which the guide rail is configured so that it can be rotated around the rotational axis relative to the baseplate, and a locked position in which the guide rail is configured so that it is non-rotatable relative to the baseplate. The locking means makes it possible to lock the orientation of the guide rail relative to the baseplate, so that an unintentional rotation of the guide rail can be reliably prevented. The guide rail may only be used to advance the guide carriage during working when the position of the guide rail is locked. If this is not the case, accidents or damage to the device system can occur.

In a preferred embodiment, a device that serves to orient the guide rail is provided between the guide rail and the baseplate. A device for orienting the guide rail has the advantage that the guide rail can be oriented very precisely with respect to the baseplate.

Especially preferably, the device for orienting the guide rail has a first guide means that is arranged on the baseplate, and a second guide means that is arranged on the guide rail. The interaction between the two guide means allows the guide rail to be oriented very precisely with respect to the baseplate.

Especially preferably, the first guide means is integrated into the first bearing element, and the second guide means is integrated into the second bearing element. The bearing element with the integrated guide means can be produced as a separate component and then joined to a conventional guide rail. This has the advantage of reducing the production work.

In a preferred embodiment, the first and second guide means are structured identically and have an elevation and at least one depression. Identically structured guide means entail the advantage that they require less production work. In the basic position, the elevation of the first guide means engages with the depression of the second guide means, while the elevation of the second guide means engages with the depression of the first guide means. Since two latching positions are provided in the basic position, the orientation of the guide rail relative to the baseplate is more precise.

Especially preferably, the guide means has one elevation and three depressions, whereby the elevation and the three depressions are each arranged on a circle and are offset by 90° with respect to each other. The operator can place the guide rail in the basic position as well as in two preferred positions that are each offset by 90° with respect to the basic position. These preferred positions have the advantage that the operator can rotate the power tool into the preferred position without any measuring work, and an unintentional rotation out of the preferred position is at least rendered more difficult. Preferred positions in the guide means lend themselves for angles that need to be set frequently. In order to set any desired angle between two drilled holes, the operator first has to measure the angle, then rotate the guide rail in the setting position to the appropriate angle, and subsequently lock the guide rail with the locking means.

Preferably, the guide means has release grooves to release the elevation. The release grooves have the advantage of reducing the wear and tear on the surface caused by the elevation when the guide rail is rotated.

In another preferred embodiment, the guide means has a spring element. This has the advantage of reducing the wear and tear of the elevation of the guide means by limiting the pressure force on the elevation or on the edges of the depression. Due to the elevation with its springy configuration, it is possible to rotate out of the preferred positions against the spring element. Here, the spring element preferably has a ball and a pressure spring. The magnitude of the elevation, the overhang of the ball, is defined by a geometrical contact of the ball in the drilled hole in the guide means.

In a preferred embodiment, the baseplate comprises a fastening plate that can be fastened to the substrate by the fastening means, and a guide rail section having a contoured means, whereby the guide rail section is joined to the axis element and the guide rail is configured so as to be rotatable around the rotational axis relative to the guide rail section. This embodiment has the advantage that the guide carriage can be moved along the guide rail as well as along the guide rail section. When work is being done on steps, core holes can be drilled into a lower step and into a higher step. Here, the basic position of the guide rail and of the guide rail section is oriented in such a way that the contoured means are flush when work is being done on the lower step since, in this case, the guide rail section can also be used to guide the power tool.

Embodiments of the invention will be described below on the basis of the drawing. The drawing does not necessarily depict the embodiments true-to-scale, but rather, the drawing is presented in schematic and/or slightly distorted form whenever necessary for the sake of clarity. Regarding additions to the teaching that can be gleaned directly from the drawing, reference is hereby made to the pertinent state of the art. In this context, it should be taken into account that a wide array of modifications and changes pertaining to the shape and the detail of an embodiment can be made, without deviating from the general idea of the invention. The features of the invention disclosed in the description, in the drawing as well as in the claims, either on their own or in any desired combination, can be essential for the refinement of the invention. Moreover, all combinations of at least two of the features disclosed in the description, in the drawing and/or in the claims fall within the scope of the invention. The general idea of the invention is not limited to the exact shape or details of the preferred embodiment shown and described below, nor is it limited to an object that would be restricted in comparison to the subject matter claimed in the claims. Regarding the dimensional ranges given, values that fall within the cited limits can also be disclosed as limit values and can be employed and claimed as desired. For the sake of simplicity, the same reference numerals will be used below for identical or similar parts or for parts having an identical or similar function.

BRIEF DESCRIPTION OF THE DRAWINGS

The following is shown.

DETAILED DESCRIPTION

Figure 1:
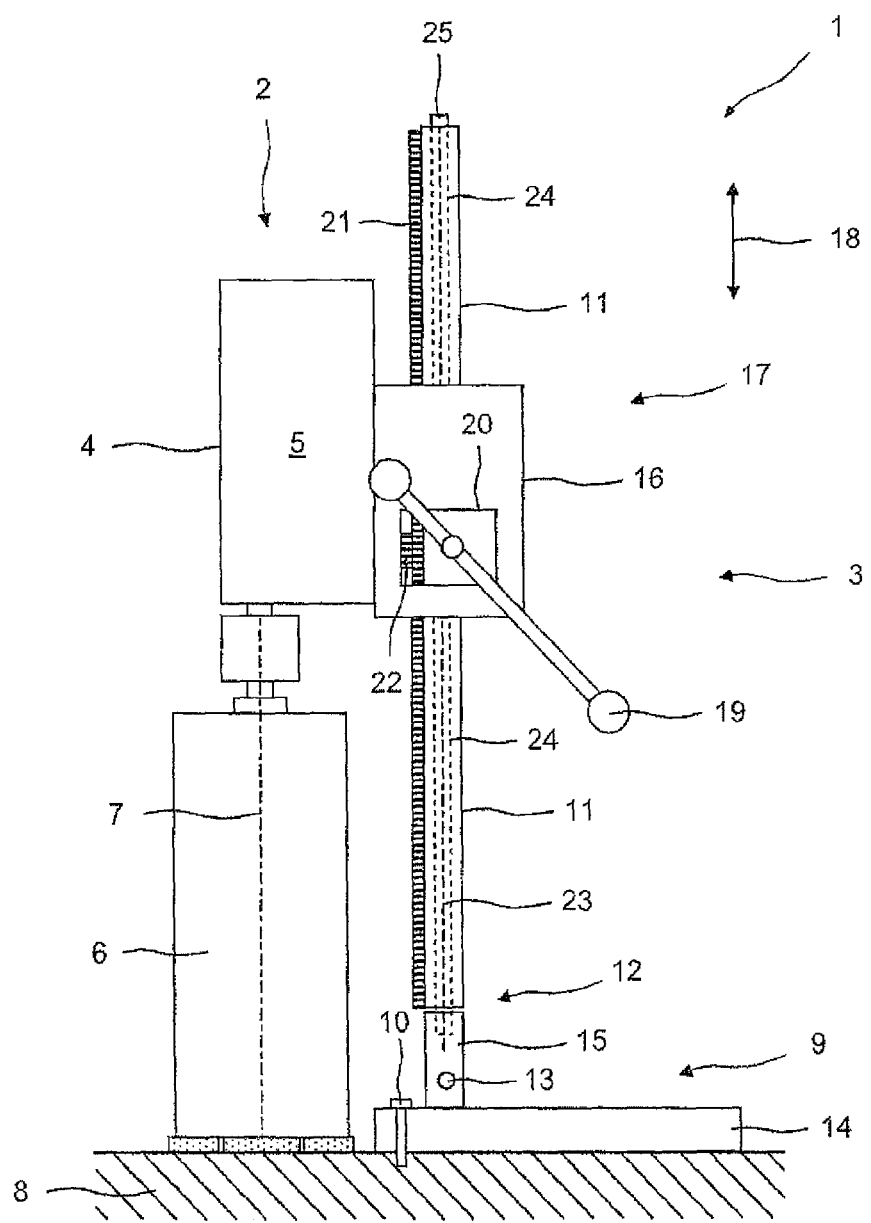
FIG. 1—a stand-mounted device system having a core-drilling device that is guided by means of a guide carriage on a guide rail of a drill stand, whereby the guide rail is configured so as to be rotatable around a rotational axis relative to a baseplate by means of an axis element.

FIG. 1 shows a schematic representation of a stand-mounted device system 1 consisting of a power tool 2 that is arranged on a guiding device 3 configured as a drill stand. The power tool is configured as a core-drilling device 2 and it comprises a machine unit 5 that is arranged in a machine housing 4 and that drives a drill bit 6 around a rotational axis 7.

The drill stand 3 is placed on a substrate 8 and includes a baseplate 9 that can be attached to the substrate 8 by a fastener or fastening means 10, and a guide rail 11 that is joined to the baseplate by a joiner or joining mechanism 12. In order to make it possible to drill slanted holes, the guide rail 11 can be inclined relative to the baseplate 9 around an inclination axis 13 that runs perpendicular to the plane of drawing. The baseplate 9 comprises a fastening plate 14 with which the baseplate 9 is fastened to the substrate 8 as well as a slanted articulation 15 that can be rotated around the inclination axis 13 and that is joined by means of the joining mechanism 12. If there is no need for the guide rail 11 to be inclined around the inclination axis 13, the slanted articulation 15 can be dispensed with and the joining mechanism 12 that joins the guide rail 11 to the baseplate 9 can either be joined directly to the fastening plate 14 or it can be joined to the baseplate 9 via a section.

The core-drilling device 2 is arranged on the drill stand 3 by means of a guide carriage 16 and can be moved along the guide rail 11 by means of an advancing mechanism 17 in an advancing direction 18. The advancer or advancing mechanism 17 comprises a drive or drive means 19 configured as a rotatable clamping rod and a transmission or transmission means 20 that transmits the movement of the drive means 19 onto the guide carriage 16. The rotational movement of the clamping rod 19 is converted by means of a toothed gear and a toothed rack into a movement of the guide carriage 16 along the guide rail 11. The guide rail 11 comprises a contour or contoured means 21 that is configured as a toothed rack and that engages with a counter-contour or counter-contoured means 22 of the transmission means 20 configured as a toothed wheel. The contoured means 21 and the counter-contoured means 22 are adapted to the drive means 19. The advancing movement of the guide carriage 16 can be generated by a manual or motor-powered drive means through a rotational movement or a linear movement. In the case of a linear drive movement, the transmission takes place, for example, via two toothed wheels.

The guide rail 11 is configured so as to be rotatable around a rotational axis 23 that is parallel to the advancing direction 18, whereby the rotational axis 23 also runs parallel to the rotational axis 7 around which the drill bit 6 is moved when the core holes are being drilled. The guide rail 11 is rotated by means of an axis element 24 that is mounted on the guide rail 11 and on the baseplate 9. The guide rail 11 can be adjusted by a lock or locking means 25 between a setting position in which the guide rail 11 can be rotated around the rotational axis 23 relative to the baseplate 9 and a locked position in which the guide rail 11 is configured to be non-rotatable relative to the baseplate 9.

Figures 2A, 2B:
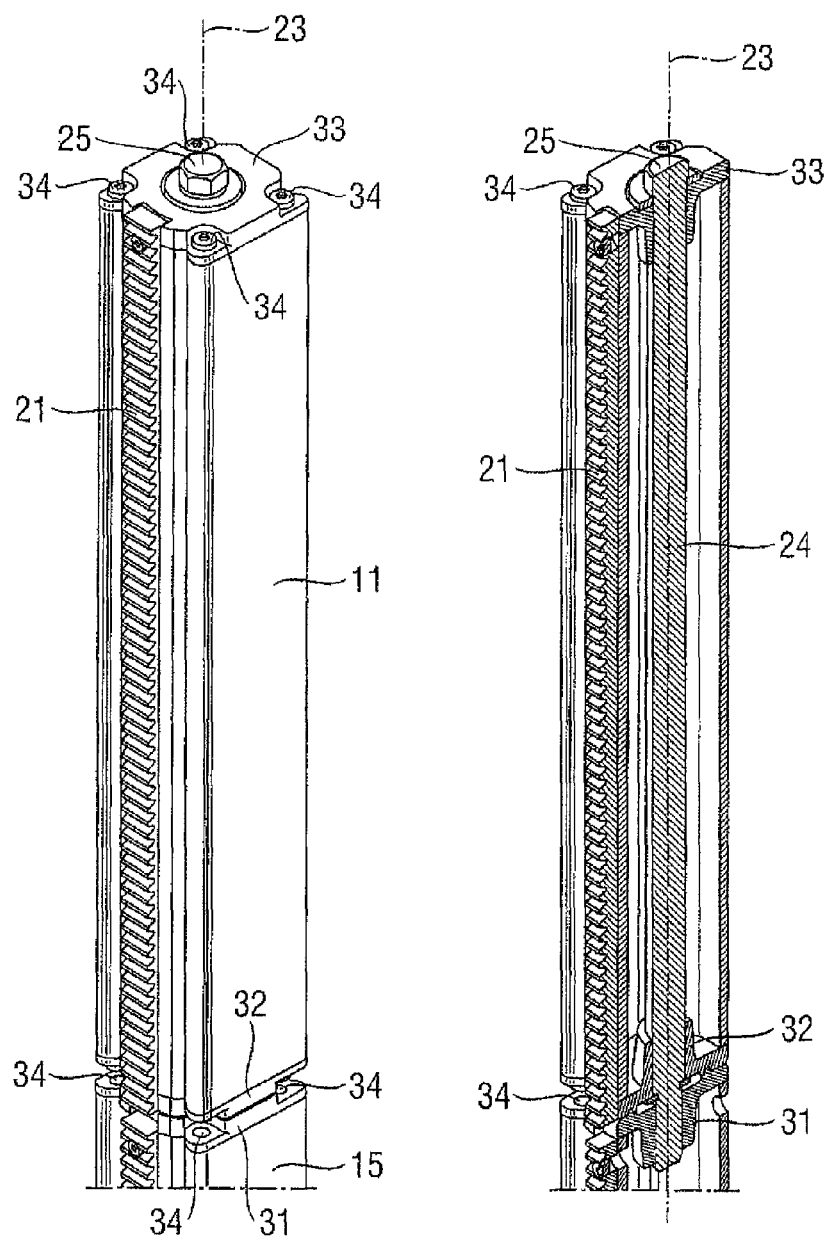
FIGS. 2A,B—the guide rail from FIG. 1, which is configured so that it can be rotated, in a three-dimensional view (FIG. 2A) and in a half-sectional view (FIG. 2B)

FIGS. 2A, 2B show the guide rail 11 from FIG. 1, which is configured so that it can rotate, in a three-dimensional view (FIG. 2A) and in a half-sectional view (FIG. 2B).

The axis element 24 is mounted in a first bearing element 31 of the baseplate 9 as well as in a second and third bearing element 32, 33 of the guide rail 11. At the top of the baseplate 9 facing the guide rail 11, the first bearing element 31 is joined non-rotatably to the baseplate 9 by means of several screwed connections 34. At the bottom of the guide rail 11 facing the baseplate 9 or at the top of the guide rail 11 facing away from the baseplate 9, the second and third bearing elements 32, 33 are each joined non-rotatably to the guide rail 11 by means of screwed connections 34. The third bearing element 33, which is arranged at the top of the guide rail 11 facing away from the baseplate 9 has the advantage that the locking means 25, which is at the top, is readily accessible and easy to operate in comparison to a locking means that is arranged between the baseplate and the guide rail.

The axis element 24 is mounted non-rotatably in the first bearing element 31 when the guide rail 11 is in the locked position as well as when it is in the setting position. The guide rail 11 is configured to be rotatable around the rotational axis 23 relative to the axis element 24 when in the setting position, and so as to be non-rotatable relative to the axis element 24 when in the locked position 24.

When the locking means 25 is released, the guide rail 11 is moved from the locking position into the setting position. In the setting position, the second and third bearing elements 32, 33 of the guide rail 11 can be rotated around the rotational axis 23 relative to the axis element 24. The guide rail 11 is rotated into the desired position and it is moved out of the setting position into the locking position by the locking means 25. For safety reasons, the guide rail may only be used to advance the guide carriage when the position of the guide rail 11 is locked, that is to say, when the locking means 25 is closed. If this is not the case, accidents or damage to the device system can occur.

Figure 3:
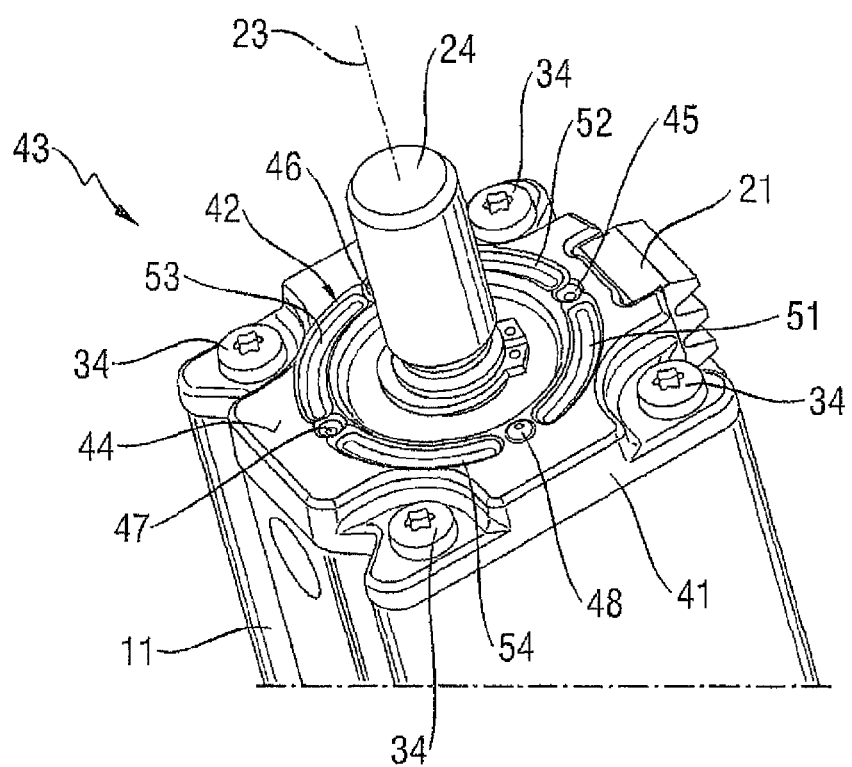
FIG. 3—a sectional view of the guide rail having a bearing element into which a guide means for orienting the guide rail is integrated.

FIG. 3 shows a sectional view of the guide rail 11 having a bearing element 41 for mounting the axis element 24, whereby the axis element 41 has a guide or guide means 42 that serves to orient the guide rail relative to the baseplate 9. For the rest, the structure of the bearing element 41 corresponds to the structure of the first and second bearing elements 31, 32 of FIGS. 2A, 2B and it is analogously joined non-rotatably to the guide rail 11 by means of screwed connections 34.

The guide means 42 is part of a device 43 for orienting the guide rail 11. The orienting device 43 comprises not only the guide means 42, which is designated as the first guide means 42 and which is provided on the guide rail 11, but also a second guide means which is integrated into the first bearing element 31 of the baseplate 9. In order to reduce the production work, the first and second guide means 42 of the orienting device 43 are structured identically.

The bearing element 41 comprises a surface 44 that faces the baseplate 9, whereby the first guide means 42 is integrated into said surface. The first guide means 42 consists of first, second and third depressions 45, 46, 47 that are embedded into the surface 44. The depressions 45, 46, 47 are arranged offset to each other by 90° on an arc. The first guide means 42 also has a guide tab in the form of an elevation 48 that is likewise arranged on the arc and that is offset by 90° relative to the first and third elevations 45, 57. The elevation 48 is arranged offset by 180° with respect to the second depression 46.

Four release grooves 51, 52, 53, 54 are embedded into the surface 44 of the first guide means 42, and they are configured in the form of a circular segment. The first release groove 51 is arranged between the elevation 48 and the first depression 45, the second release groove 52 is arranged between the first and second depressions 45, 46, while the third release groove 53 is arranged between the second and third depressions 46, 47, and the fourth release groove 54 is arranged between the third depression 47 and the elevation 48.

In the basic position, the elevation 48 of the first guide means 42 engages with the second depression of the second guide means, while the elevation of the second guide means engages with the second depression 46 of the first guide means 42. In order to drill a hole that is arranged offset by 90°, the locking means 25 is released and the guide rail 11 is rotated around the rotational axis 23 into the position that is offset by 90°, in which the elevation 48 of the first guide means 42 engages with the third depression of the second guide means, and the elevation of the second guide means engages with the first depression of the first guide means 42. Subsequently, the locking means 25 is closed and the device system 1 is ready to drill the next core hole.

Figure 4A:
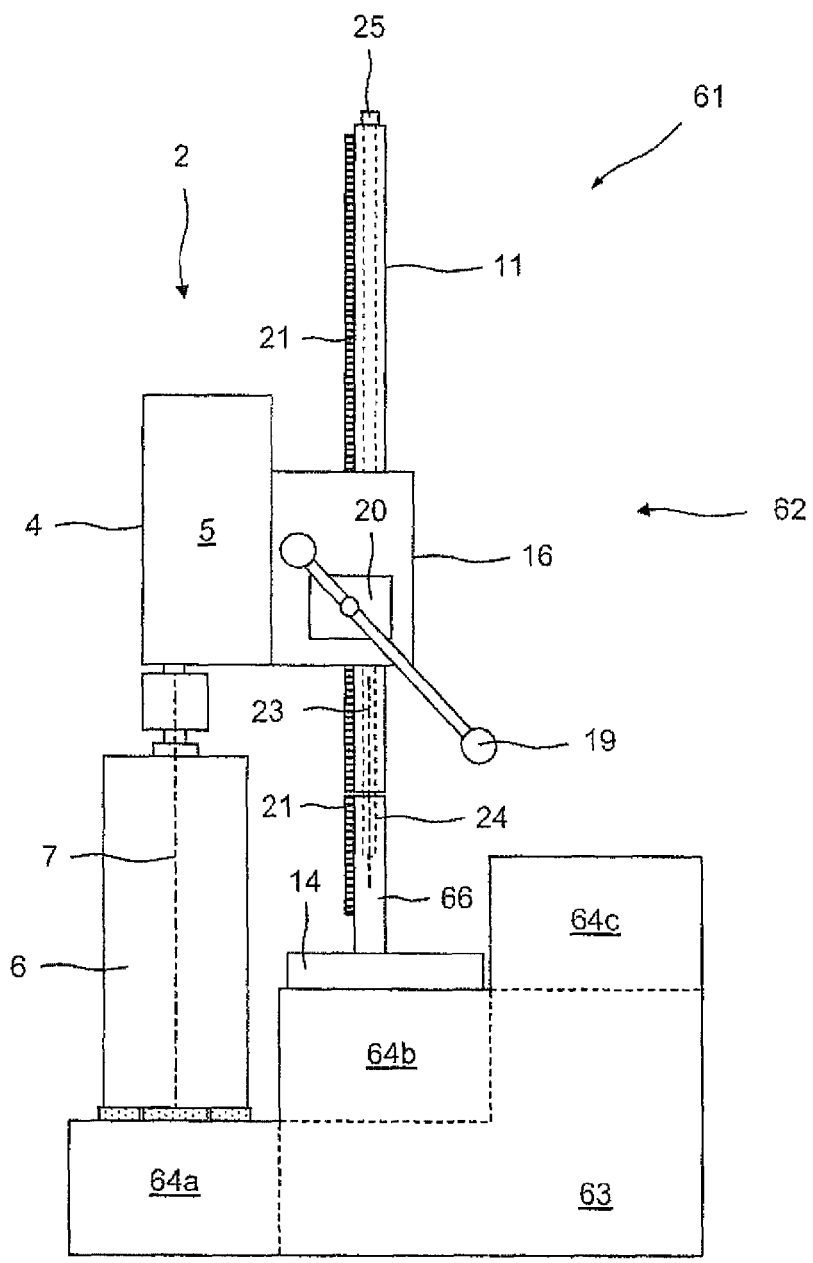
FIGS. 4A,B—the use of a stand-mounted device system having a guide rail configured so as to be rotatable, during the drilling of core holes in stairs, whereby core holes are drilled into a lower step (FIG. 4A) and into a higher step (FIG. 4B).
Figure 4B:
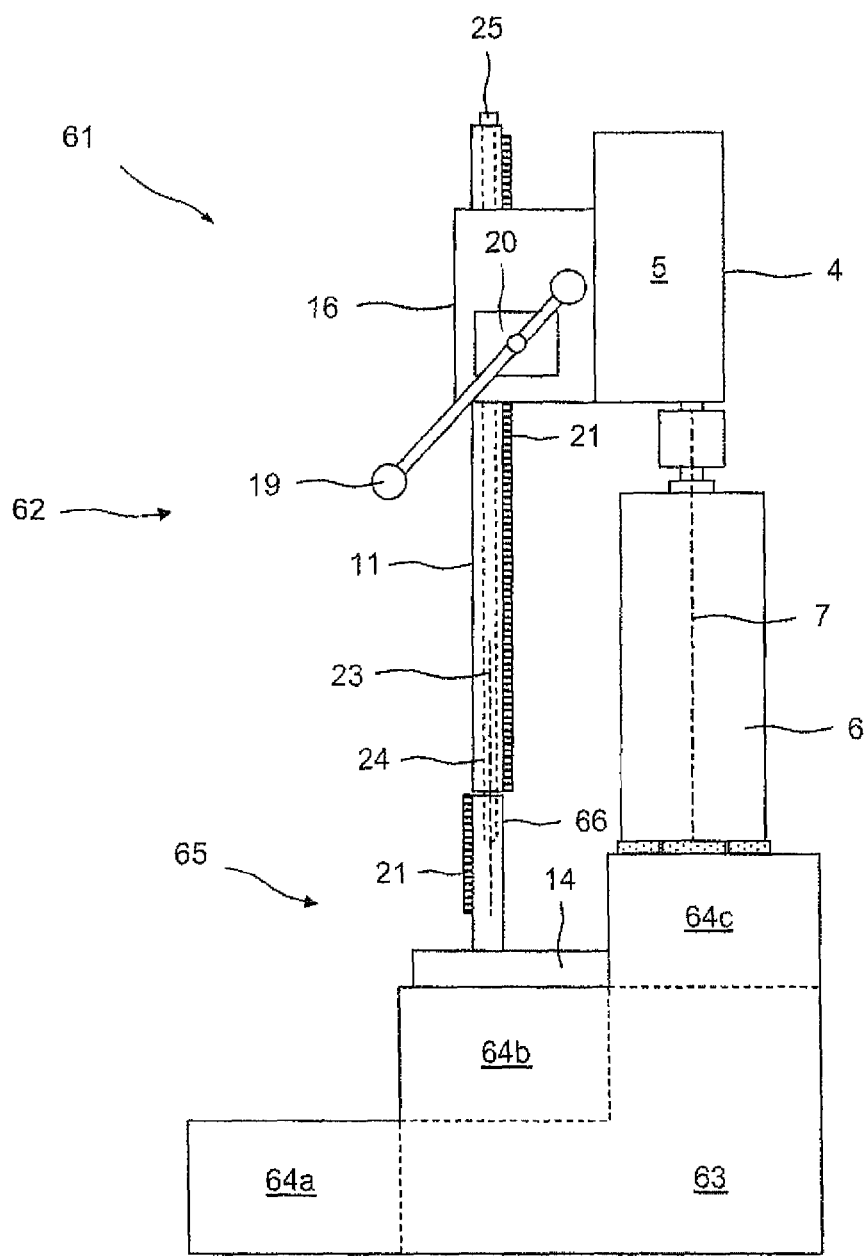

FIGS. 4A, 4B show the use of a stand-mounted device system 61 having a drill stand 62 according to the invention, during the drilling of core holes in stairs 63 having a first step 64a, a second step 64b and a third step 64c. In this context, FIG. 4A shows the device system 61 in a first arrangement in which a core hole is being drilled into the lower, first step 64a, while FIG. 4B shows the device system 61 in a second arrangement in which a core hole is being drilled into the higher, third step 64c.

The drill stand 64 differs from the drill stand 3 of FIG. 1 in terms of the structure of the baseplate 65. The baseplate 65 comprises not only the fastening plate 14 with which the baseplate 65 is fastened to the substrate 8 but also another guide rail section 66. The guide rail section 66, like the guide rail 11, comprises the contoured means 21 that engages with the counter-contoured means 22 of the transmission means 20.

For purposes of securely joining the guide rail 11 to the baseplate 9, the guide rail section 66 is not configured so that it can be slanted, but rather, it is rigidly joined to the baseplate 65. When core holes are drilled, large forces and torques are exerted that have to be absorbed. If necessary, the guide rail section 66 can be configured so that it can be slanted with respect to the fastening plate 14.

The drill stand 62 is fastened to the second step 64b by the fastening means 10. The drill stand 62, which is located on the second step 64b, is oriented in such a way that the contoured means 21 of the guide rail 11 and the contoured means 21 of the guide rail section 66 are flush with each other in the basic position in the first arrangement, in which the core hole is being drilled in the lower, first step 64a. This entails the advantage that the guide carriage 16 can also be moved along the guide rail section 66 by means of the advancing mechanism 17.

The guide rail 11, which is configured so that it can rotate around the rotational axis 23, allows the core-drilling device 2, which is fastened to the second step 64b, to drill core holes in the first and third steps 64a, 64c.

What is claimed is:

1. A device for guiding a power tool along an advancing direction, the device comprising:
   a baseplate fastenable to a substrate by a fastener;
   a guide rail joinable to the baseplate and having a contour;
   a guide carriage for guiding the power tool along the advancing direction, the guide carriage having a counter-contour engageable with the contour, the guide rail joined to an axis element and rotatable relative to the baseplate around a rotational axis parallel to the advancing direction; and an orienter for orienting the guide rail between the guide rail and the baseplate; wherein the orienter is arranged on the baseplate, and the guide rail includes a first and a second guide, wherein the first and second guides are structured identically and have an elevation and at least one depression; and wherein the first guide has three depressions, the elevation and the three depressions each arranged on a circle and offset by 90° with respect to each other.

2. The device as recited in claim 1 wherein the axis element is mounted in a first bearing element of the baseplate and in a second bearing element of the guide rail.

3. The device as recited in claim 2 wherein the axis element is mounted in an additional bearing element of the guide rail, the additional bearing element arranged on an end of the guide rail facing the baseplate.

4. The device as recited in claim 1 wherein the axis element is joined non-rotatably to the baseplate while the guide rail is configured so as to be rotatable around the rotational axis relative to the axis element.

5. The device as recited in claim 1 wherein the axis element is configured so as to be joined non-rotatably to the guide rail and so as to be rotatable around the rotational axis relative to the baseplate.

6. The device as recited in claim 1 further comprising a lock for locking the guide rail, the guide rail movable by the lock between a setting position, the guide rail rotatble around the rotational axis relative to the baseplate in the steering position, and a locked position, the guide rail non-rotatable relative to the baseplate in the locked position.

7. The device as recited in claim 1 wherein the first guide is integrated into a first bearing element, and a second guide is integrated into a second bearing element.

8. The device as recited in claim 1 wherein the first guide has release grooves to release the elevation during a rotation around the rotational axis.

9. The device as recited in claim 1 wherein the first guide has a spring element.

10. The device as recited in claim 1 wherein the baseplate includes a fastening plate fastenable to a substrate by the fastener, the guide rail section is joined to the axis element and the guide rail is configured so as to be rotatable around the rotational axis relative to the guide rail section.

* * * * *